UNITED STATES PATENT OFFICE.

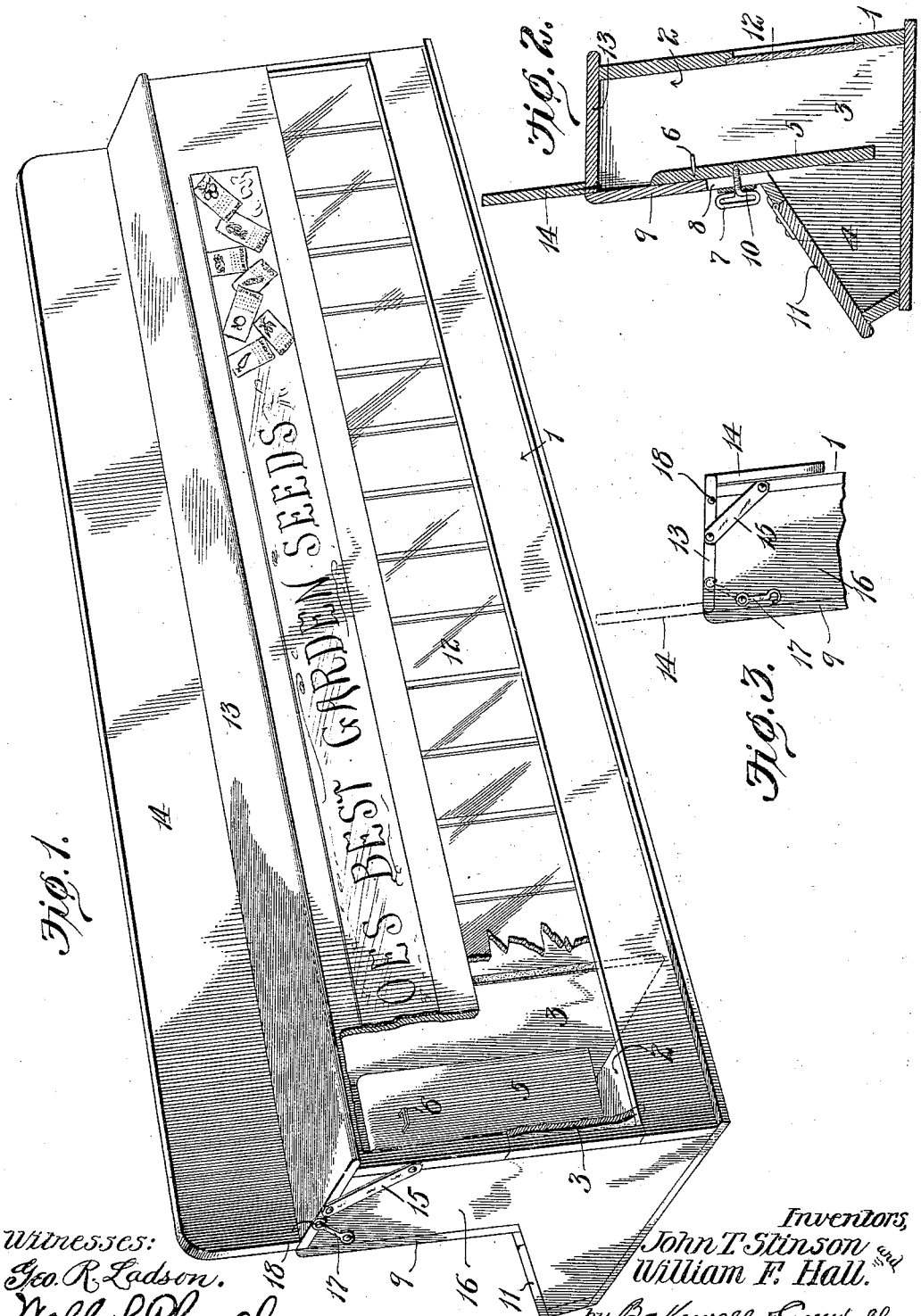

JOHN T. STINSON AND WILLIAM FREDERICK HALL, OF SPRINGFIELD, MISSOURI, ASSIGNORS TO THE PLANTERS SEED COMPANY, OF SPRINGFIELD, MISSOURI, A CORPORATION OF MISSOURI.

DISPLAY-CABINET.

No. 841,349.	Specification of Letters Patent.	Patented Jan. 15, 1907.

Application filed October 25, 1906. Serial No. 340,571.

*To all whom it may concern:*

Be it known that we, JOHN T. STINSON and WILLIAM FREDERICK HALL, both citizens of the United States, residing at Springfield, Missouri, have invented a certain new and useful Improvement in Display-Cabinets, of which the following is a full, clear, and exact description, such as will enable others skilled in the art to which it appertains to make and use the same, reference being had to the accompanying drawings, forming part of this specification, in which—

Figure 1 is a perspective view of a cabinet embodying the features of our invention. Fig. 2 is a transverse sectional view of same, showing the display-panel in operative position; and Fig. 3 is an end view of a portion of the cabinet, showing the display-panel in an inoperative position.

This invention relates to devices for displaying merchandise for sale, and particularly to cabinets for containing granular substances—such, for example, as grains, seeds, beans, spices, coffee, &c.

The main object of our invention is to provide a cabinet which can be constructed at a small cost and be used by a wholesaler for shipping granular merchandise to a retailer who can use the cabinet for displaying the merchandise.

The cabinet is so constructed that the merchandise contained therein can be readily seen by a prospective purchaser standing on one side of the store-counter on which the cabinet is placed without enabling the customer to handle said merchandise, the cabinet being provided at its front side with compartments in which the merchandise is stored and at its rear side with delivering-compartments from which the merchandise can be removed by the clerk standing on the opposite side of the counter.

One novel feature of the cabinet consists in a combined lid and display-panel, which can be adjusted into one position when the cabinet is being used by the retailer so as to expose to view the name of the wholesaler or manufacturer of the merchandise contained in the cabinet and which can be adjusted into a different position when the cabinet is being transported to move the display-panel into an inoperative position for protecting the advertising or indicating labels pasted on the front of the cabinet and also reduce the dimensions of the cabinet.

Other desirable features of the cabinet will be hereinafter pointed out.

Referring to the drawings, which represent the preferred form of our invention, 1 designates a cabinet that is divided into a plurality of storage-compartments 2, formed by partitions 3, located on the inside of the cabinet. Extending rearwardly from each storage-compartment is a delivering-compartment 4, which is separated from the storage-compartment by an adjustable slide 5. This slide is provided with a finger-piece consisting of a staple 6, which is driven into the slide and is held in adjusted position by a winged screw 7, which projects through an elongated slot 8 in the rear wall 9 of the cabinet, a washer 10 being mounted on the shank of the screw between the winged head and the rear wall of the cabinet.

The delivering-compartments at the back of the cabinet are covered by a lid 11, and the front wall of the cabinet is provided with a plate of glass 12, which enables the contents of the cabinet to be seen by the purchaser standing on the front side of the counter. The flow or passage of the merchandise from the storage-compartments to the delivering-compartments can be varied or entirely cut off, as desired, and as the delivering-compartments are located at the rear of the cabinet it is impossible for a purchaser to handle the merchandise therein or surreptitiously remove any of the same.

At the top of the cabinet is a combined lid and display-panel, consisting of the members 13 and 14, which are arranged at right angles to each other and rigidly connected together, the vertically-disposed member 14 being adapted to receive the name or trade-mark of the wholesaler or manufacturer of the merchandise contained in the cabinet. Links 15 pivotally connect the combined lid and display-panel to the end walls 16 of the cabinet, and said combined lid and display-panel is locked in position by means of hooks 17, which engage projections 18, as shown in the drawings.

The combined lid and display-panel can be adjusted into the position shown in Figs. 1 and 2 when the cabinet is set up in a store so as to expose to view the name of the wholesaler or producer of the merchandise.

When the cabinet is in storage or being transported from the wholesaler to the retailer, the combined lid and display-panel is adjusted into the position shown in Fig. 4 to cause the display-panel to project downwardly outside of the front wall of the cabinet and protect the labels pasted on the front wall of the cabinet as well as reducing the dimensions of the cabinet.

Having thus described our invention, what we claim as new, and desire to secure by Letters Patent, is—

1. A cabinet divided into a number of compartments and provided with a combined lid and display-panel consisting of two members rigidly connected together and arranged approximately at right angles to each other, and links pivotally connecting said combined lid and display-panel to the end walls of the cabinet; substantially as described.

2. A cabinet divided into a number of compartments and provided with a combined lid and display-panel consisting of two members rigidly connected together and arranged approximately at right angles to each other, links pivotally connecting said combined lid and display-panel to the end walls of the cabinet, and locking devices for holding said combined lid and display-panel in position; substantially as described.

3. A cabinet consisting of two end walls provided with rearwardly-extending portions, front and rear walls, partitions conforming in shape to said end walls and dividing the cabinet into a plurality of compartments, a slide for each compartment provided with a winged screw which extends through an elongated slot in the rear wall of the cabinet, a washer arranged between the wings of said screw and the rear wall of the cabinet, a combined lid and display-panel consisting of two members rigidly connected together and arranged at approximately right angles to each other, and means for pivotally connecting said combined lid and display-panel to the end walls of the cabinet whereby it can be so adjusted that the display is moved into or out of an operative position; substantially as described.

4. A cabinet divided into a number of compartments and provided with a combined lid and display-panel consisting of two members connected together and arranged approximately at right angles to each other, and links pivotally connecting said lid and display-panel to the end walls of the cabinet whereby said lid and panel can be so arranged that the display-panel extends downwardly over the front wall of the cabinet; substantially as described.

In testimony whereof we hereunto affix our signatures, in the presence of two witnesses, this 22d day of October, 1906.

JOHN T. STINSON.
WILLIAM FREDERICK HALL.

Witnesses:
J. L. HINE,
C. A. FERGUSON.